May 5, 1931. H. E. ADAMS 1,803,885
PRIMING MECHANISM FOR CENTRIFUGAL PUMPS
Filed Dec. 2, 1929 2 Sheets-Sheet 2
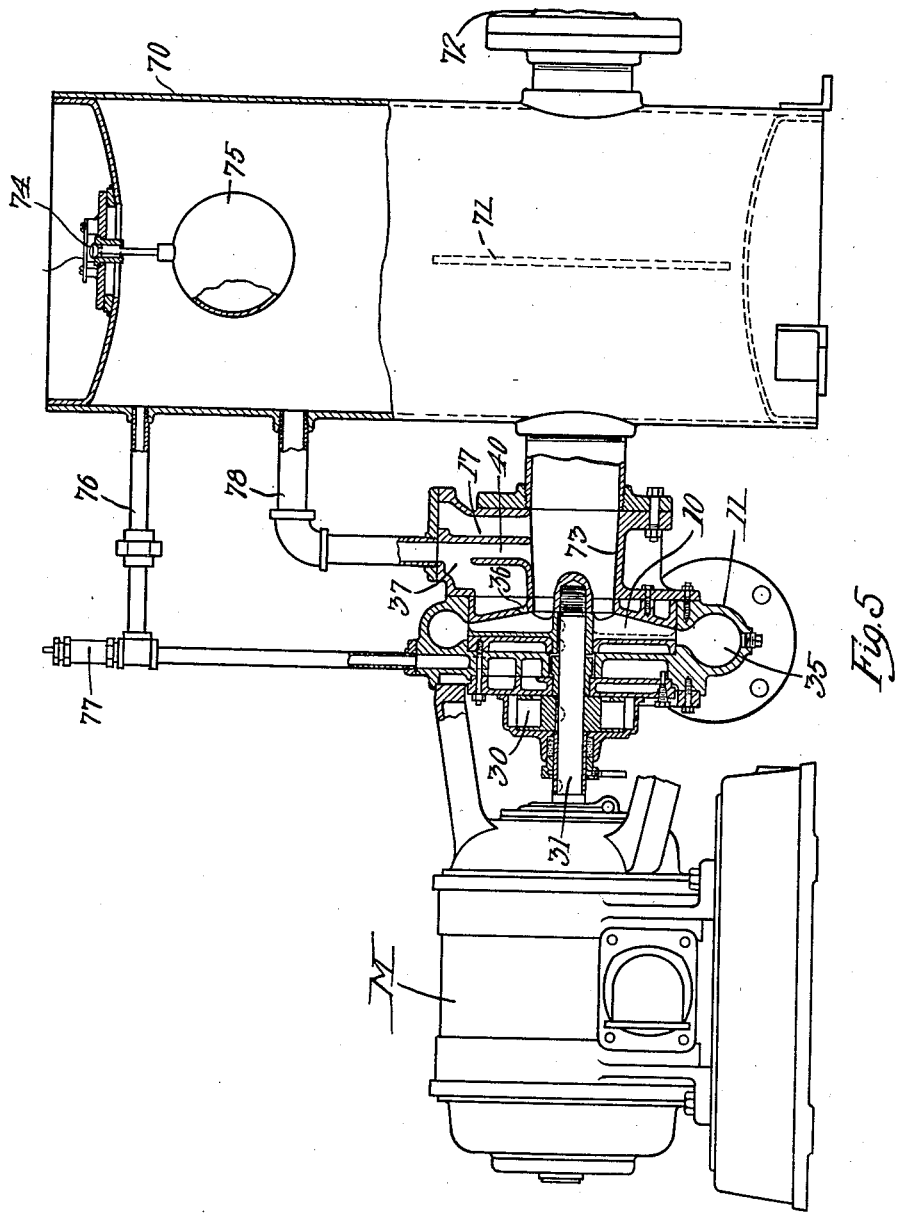
INVENTOR
Harold E. Adams
BY
Southgate Hayr Hawley
ATTORNEYS Patented May 5, 1931

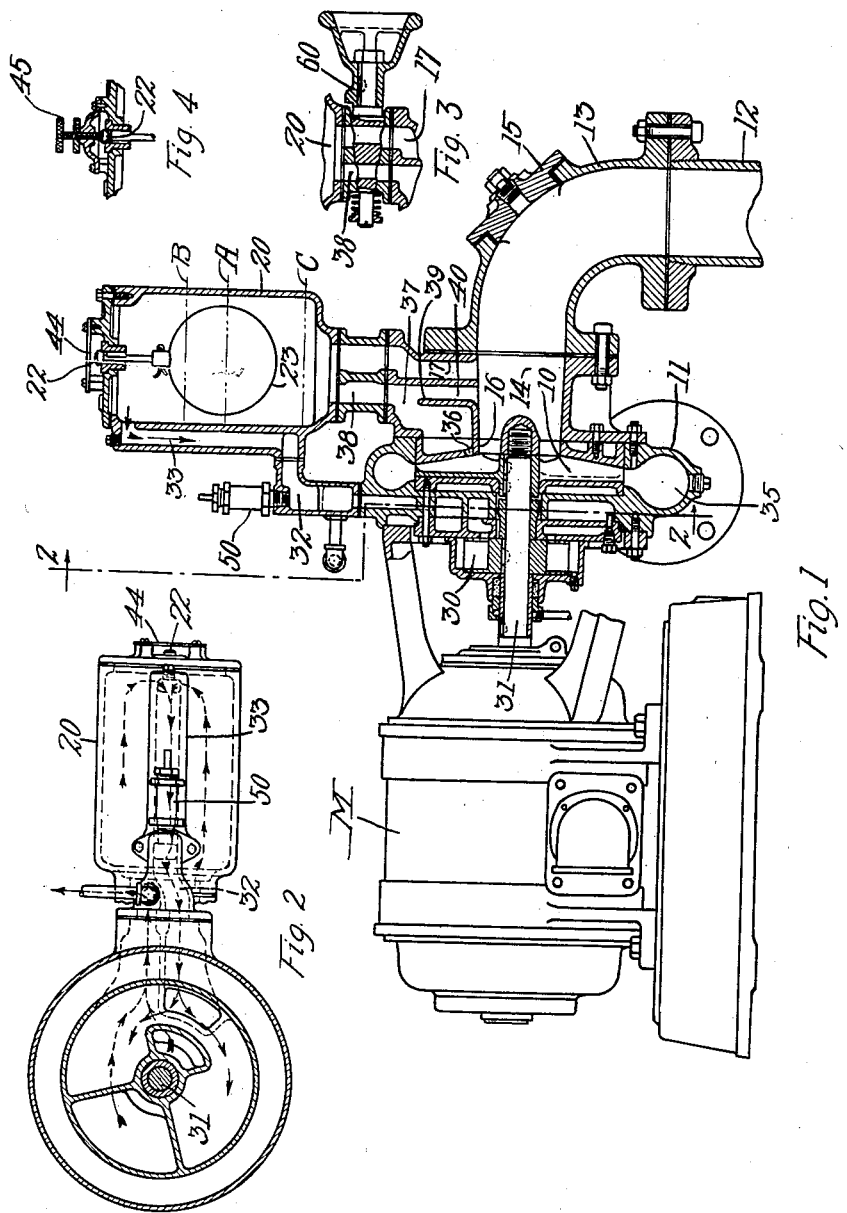

1,803,885

UNITED STATES PATENT OFFICE

HAROLD E. ADAMS, OF SOUTH NORWALK, CONNECTICUT, ASSIGNOR TO NASH ENGINEERING COMPANY, OF SOUTH NORWALK, CONNECTICUT, A CORPORATION OF CONNECTICUT

PRIMING MECHANISM FOR CENTRIFUGAL PUMPS

Application filed December 2, 1929. Serial No. 410,915.

This invention relates to mechanism for priming a centrifugal pump and for removing air entrained in the water to be handled by such a pump.

It has been proposed heretofore to provide an air pump for priming a centrifugal pump, and to provide a control device for venting the air pump when the air has been exhausted to a predetermined extent.

It has been found, however, that the operation of such a combination is not always satisfactory, due to a so-called "hunting" action which develops under certain conditions and which causes the degree of air exhaustion to vary somewhat widely above the desired point, and which causes such an alternate operation to be regularly repeated, often with increasing intensity.

It is the object of my invention to provide means for damping or balancing the control device, thus ironing-out the pressure variations and enabling the air pump to maintain substantially uniform operating conditions for the centrifugal pump.

In the preferred embodiment of my invention, I accomplish the desired purpose by the provision of a vacuum relief valve in the air pump connections to the control device and I also provide means for limiting the travel of the air vent valve. Either one of these devices is helpful in controlling the hunting action, but their effect in combination is particularly satisfactory.

My invention further relates to arrangements and combinations of parts which will be hereinafter described and more particularly pointed out in the appended claims.

A preferred form of the invention is shown in the drawings, in which

Fig. 1 is a front elevation, partly in section, of pumping apparatus embodying my improvements;

Fig. 2 is a side elevation, with certain parts shown in section along the line 2—2 in Fig. 1;

Figs. 3 and 4 are detail views of slight modifications to be described; and

Fig. 5 is a front elevation, partly in section, of a modified form of my invention.

Referring particularly to Fig. 1, I have shown a pumping mechanism including a centrifugal pump having an impeller 10 rotatable in a casing 11 and driven by a suitable motor M.

The centrifugal pump is designed to raise water through a suction pipe 12, elbow connection 13, and intake 14. A suitable cleanout door 15 is preferably provided in the elbow portion 13. The intake 14 communicates directly with the eye 16 of the impeller casing.

A passage 17 leads upward from the intake 14 to a control chamber 20. A vent valve 22 is mounted at the top of the control chamber 20 and is actuated by a float 23 in the chamber 20. As the water level rises in the chamber 20, the valve 22 is opened to vent the chamber and admit air at atmospheric pressure thereto.

An air pump 30 is mounted on the motor armature shaft 31 and is connected through exhaust passages 32 and 33 to the upper part of the control chamber 20. The air pump 30 acts continuously to exhaust the chamber 20 and to remove any air which may be entrained in the water in the intake 14 and which may enter the chamber 20 through the passage 17.

The air pump 30 is also effective to remove air pocketed in the volute 35 of the impeller casing 11. During the priming operation, the air in the volute 35 is gradually forced toward the center of the impeller 10 as the volute is filled with water and this air eventually escapes through a small opening 36 to a separating chamber 37, the upper part of which is connected to a passage 38 to the control chamber 20.

A baffle plate or half-height partition 39 in the chamber 37 allows water escaping with the air through the opening 36 to be separated from the air and to be returned to the intake 14 through an open connection 40. The air escaping through the opening 36 travels upward through the passage 38 to the control chamber 20, from which it is exhausted by the air pump.

The provision of the separate return passage 40 from the chamber 37 is a marked improvement over previous practice, as the water traveling downward through the passage 40 does not encounter the air flowing upward through the passage 17.

I will now indicate certain defects in operation which have been observed with this general type of apparatus under certain conditions, which defects it is the object of my invention to remedy.

When such mechanism is placed in operation, the air pump gradually exhausts the control chamber 20 as well as the volute 35. As the air is progressively exhausted, the water level rises from the intake 14 to the chamber 20.

If the valve 22 were opened when the water reached a predetermined level in the chamber 20, such as the line A, all elements would be substantially in equilibrium and the water pump would operate satisfactorily for an indefinite period.

Such a condition might perhaps be attained manually, but in the actual automatic operation of the pump the following cycle of events commonly takes place:—The valve 22 is not opened when the float 23 reaches the predetermined level of the line A, as the chamber 20 has been exhausted substantially below atmospheric pressure and the difference in pressure at the two sides of the valve 22 must be overcome. This means that the water must rise to a height above the line A in order to overcome this difference in pressure and this rise of the water is increased by the inertia of the rising water column.

The valve 22 is thus opened too late, with the water at an unduly high level such as is indicated by the line B. The valve 22 then opens abruptly, the air pump is vented, the exhaust in the control chamber 20 is relieved, and the water drops rapidly downward from said upper limit.

When the water level reaches the line A, which is the normal opening and closing position of the valve 22, the valve will close, but by this time the entire water column has acquired a certain momentum and the water level continues to fall, partly due to the momentum and partly due to the fact that the air pump has not had sufficient time to fully exhaust the air in the chamber after the closing of the valve 22.

The water level continues to fall in the control chamber 20, eventually coming to rest at a point indicated by the lower line C. By this time the air pump has developed an excessively low exhaust pressure in the chamber 20 in its effort to overcome the inertia of the water column. When the water has been brought to rest, it immediately surges back into the chamber 20, due to this low exhaust pressure, and rises to the upper level B, thus causing a repetition of the cycle of operations previously described.

In many cases, there is not only a repetition of the cycle, but a gradual building up of the hunting action until at the lower level air may pass downward through the passages 17 and 40 to the intake of the centrifugal pump, and at the upper level water may pass over through the passages 33 and 32 to the air pump 30. This causes the operation of both pumps to become more or less erratic and is apt to cause serious injury to the air pump, as the water in the intake 14 often contains sand or grit or other foreign material in suspension, which will be carried over into the air pump and seriously injure the moving parts thereof.

In order to control the "hunting" operation above described, I have provided certain definite improvements. In the first place, I have provided means for limiting the opening travel of the air vent valve 22. Such means may comprise either the cross bar 44 (Fig. 1) secured in fixed position above the valve 22, or the adjusting screw 45 (Fig. 4) which may be raised or lowered to limit the travel of the valve 22 to any desired amount. By thus limiting the travel of the valve, the air entering when the valve is opened may be made just sufficient to check the upward travel of the water, without excessively raising the pressure in the control chamber 20, which occurs when the valve is opened too widely.

The construction shown in Fig. 4 is particularly desirable, as this permits of adjustment relative to the capacity of the air pump 30 and also relative to the lift under which the centrifugal pump is operating. Under a high lift, the valve 22 should be opened less than when operating under a low lift, as more air will flow in through the same valve opening under a higher lift.

As a further aid to controlling the hunting or surging action of the water in the control mechanism, I provide a vacuum relief valve 50 at some suitable point in the connections between the air pump 30 and the control chamber 20. I have indicated the valve as connected to the exhaust passage 32. This relief valve may be of any usual construction and is preferably a spring-operated valve which may be adjusted to open inward whenever the exhaust pressure is lowered below a predetermined amount.

The relief valve 50 is commonly adjusted so that it will start to open when the rising water reaches some lower level, such as the line designated C. As the exhaust pressure in the chamber 20 is lowered and the water rises, the valve 50 opens gradually, admitting more air into the exhaust connections 32 and 33. The pump 30 has a constant capacity at a given vacuum but it is now not only removing air from the chamber 20 but atmospheric air which enters through the relief valve 50. This causes a slowing down of the rate of exhaustion of the chamber 20 and a corresponding slowing down of the inertia of the water column in the suction pipe 12, intake 14, and other water connections.

By the time the water has reached the level indicated by the line A, the water column has been retarded to such an extent that it is rising very slowly. At this point considerable air is being admitted through the relief valve 50. As soon as the weight of the float 23 and the excess pressure on the valve 22 has been overcome, the valve 22 opens, admitting additional atmospheric air into the chamber 20. This admission of air immediately raises the pressure in the chamber 20, whereupon the valve 50 closes to a greater or less extent, thus tending to maintain the desired exhaust pressure in the chamber 20.

This closing of the valve 50 counteracts to a considerable extent the opening of the valve 22, so that the exhaust pressure in the tank 20 is not relieved to the extent otherwise occurring.

The upward travel of the water column is commonly arrested at some level between the lines A and B such that the valve 22 is "cracked" slightly, and a substantially balanced condition is achieved between the relative openings of the valves 22 and 50 and the water level in the chamber 20. By this combination, an automatic balancing of conditions in the system is maintained and the surging or rise and fall of the water in the chamber 20 is largely eliminated.

If the pump is to operate under a positive head, it is desirable that the control chamber 20 be cut out of operation, as otherwise an excess flow of water into the chamber 20 will occur, which water will escape through the opened valve 22. To prevent such action, I preferably provide the shut-off valve 60 indicated in Fig. 3, said valve being inserted across the passages 17 and 38 below the control chamber 20.

The vacuum relief valve 50 has an important function in connection with such operation of the centrifugal pump under positive head. If the shut-off valve 60 is closed when the water level is relatively low in the chamber 20, the valve 22 will thereafter remain closed and a very high vacuum would be induced by the air pump in the chamber 20 if it were not for the relief valve 50, which effectively limits the degree of vacuum and thus limits the load on the air pump.

In certain applications of my invention, a large inward leakage of atmospheric air to the suction line is unavoidable, and this air is entrained in the water to such an extent that it does not have time to separate in the passages 14 and 17 as previously described. More or less of the air is then drawn in by the impeller 10, and the action of the centrifugal pump is seriously affected.

Under such conditions, I provide the construction shown in Fig. 5, in which a relatively large suction tank 70 is provided, having a baffle plate 71 in its lower portion between the suction inlet 72 and the intake 73 to the centrifugal pump. An air vent valve 74 controlled by a float 75 is provided at the top of the suction tank 70. The upper part of the tank 70 is connected through a pipe 76 to the air pump, and a vacuum relief valve 77 is provided in the connection 76. An exhaust connection 78 is provided for venting the centrifugal pump into the suction chamber 70.

The operation of this embodiment of my invention is substantially similar to that previously described, but the relatively large capacity of the suction chamber 70 permits the air and water to be more effectively separated, where the water contains a large amount of entrained air.

Having thus described my invention, it will be seen that I have provided improvements over the mechanism previously used by which the utility thereof is increased and by which continuous and satisfactory operation is made possible.

Accordingly, I do not wish to be limited to the details herein disclosed, otherwise than as set forth in the claims, but what I claim is:—

1. Mechanism for priming a centrifugal pump comprising an air pump, a control chamber, connections from said control chamber to said air pump and to said centrifugal pump, a vent valve for said control chamber, a float effective to open said vent valve when the water in said chamber reaches a predetermined level, and a vacuum relief valve for said control chamber.

2. Mechanism for priming a centrifugal pump comprising an air pump, a control chamber, connections from said control chamber to said air pump and to said centrifugal pump, a vent valve in said control chamber, means to open said valve when the water in said chamber reaches a predetermined level, and additional means to admit air when the pressure in said chamber and connections falls below a predetermined limit.

3. Mechanism for priming a centrifugal pump comprising an air pump, a control chamber, connections from said control chamber to said air pump and to said centrifugal pump, a vent valve in said control chamber, means to open said valve when the water in said chamber reaches a predetermined level, means to limit the rate of venting of said control chamber, and additional means to vent said chamber and connections when the pressure therein falls below a predetermined limit.

4. Mechanism for priming a centrifugal pump comprising an air pump, a control chamber, connections from said control chamber to said air pump and to said centrifugal pump, means to admit air to said control chamber and connections when the water level therein rises above a predetermined level, and additional means to admit air to said control chamber and connections when the pressure therein falls below a predetermined limit.

5. Mechanism for priming a centrifugal pump comprising an air pump, a control chamber, connections from said control chamber to said air pump and to said centrifugal pump, a vent valve in said control chamber, a float effective to open said valve when the water in said chamber reaches a predetermined level, and vacuum relief means to prevent substantial surging of the water above or below said predetermined level.

6. In a pumping apparatus, a centrifugal pump, an intake pipe, a control chamber, a direct connection between said intake pipe and said control chamber, a connection between said centrifugal pump casing and said control chamber, means to separate air and water in said latter connection, and a separate and additional connection through which the separated water may be returned to said intake pipe.

7. In a pumping apparatus, a centrifugal pump, an intake pipe, a control chamber, a direct connection between said intake pipe and said control chamber, a connection between said centrifugal pump casing and said control chamber, a separating baffle in said latter connection and a separate passage direct from said connection to said intake pipe.

8. Mechanism for priming a centrifugal pump comprising an air pump, a control chamber, connections from said control chamber to said air pump and to said centrifugal pump, a vent valve for said control chamber, a float effective to open said vent valve when the water in said chamber reaches a predetermined level, a vacuum relief valve for said control chamber, and means to close the connection between said chamber and said centrifugal pump, said relief valve being effective to prevent overload of said air pump when said connection is closed.

In testimony whereof I have hereunto affixed my signature.

HAROLD E. ADAMS.